3,535,393
THERMAL ADDITION OF POLYFLUOROALKYL IODIDES TO ETHYLENE

Walter Blöchl, Karlsruhe, Germany, assignor to FMC Corporation, New York, N.Y., a corporation of Delaware
No Drawing. Continuation-in-part of application Ser. No. 455,615, May 13, 1965. This application Apr. 8, 1968, Ser. No. 719,692
Int. Cl. C07c 17/28
U.S. Cl. 260—653.1     3 Claims

ABSTRACT OF THE DISCLOSURE

Polyfluoroalkyl iodides and ethylene are heated in the gaseous phase at about atmospheric pressure to produce 1 - iodo - 1,1,2,2-tetrahydropolyfluoroalkanes. Optimum yields and conversion are realized at about 400° C. at residence periods of about 16 seconds. An essentially 1:1 adduct is obtained.

---

This application is a continuation-in-part of Ser. No. 455,615 filed May 13, 1965 now abandoned.

BACKGROUND OF THE INVENTION

Field of the invention

This invention relates to fluorinated compounds. More particularly, it pertains to the production of 1-iodo-1,1,2,2-tetrahydropolyfluoroalkanes by the thermal addition of polyfluoroalkyl iodides to ethylene.

Description of the prior art

The thermal addition of polyfluoroalkyl iodides to ethylene is well known, having been first disclosed in the J. Chem. Soc. 2856 (1949) by Haszeldine who carried out the reaction using perfluoroalkyl iodides and ethylene. In the usual procedure, the polyfluoroalkyl iodide and ethylene are heated together under pressure at about 200° C. to about 250° C. for a period of from a few hours to several days. The desired 1:1 addition product of ethylene and polyfluoroalkyl iodide is a 1-iodo-1,1,2,2-tetrahydropolyfluoroalkane and has the formula $$R_f\text{—}CH_2CH_2I$$

where $R_f$ represents a polyfluoroalkyl group.

According to Brace (U.S.P. 3,016,406) the mechanism of the thermal reaction involves the homolysis of the carbon-iodine bond with concomitant formation of a polyfluoroalkyl radical ($R_f\cdot$) and an iodine atom which moieties add across the double bond of the ethylene. The reaction can be represented by the following scheme:

$$R_fI \rightarrow R_f\cdot + I\cdot$$

$$R_f\cdot + H_2C=CH_2 \rightarrow R_f\text{—}CH_2\text{—}CH_2\cdot$$

$$R_f\text{—}CH_2\text{—}CH_2\cdot + I\cdot \rightarrow R_f\text{—}CH_2CH_2\text{—}I$$

In actual practice, however, the reaction engenders a variety of by-products due to the dehydroiodination of the adduct $$R_fCH_2CH_2I \rightarrow R_fCH=CH_2 + HI$$

The hydrogen iodide formed can react with the adduct to form an iodine-free compound and elemental iodine, thus:

$$R_fCH_2CH_2I + HI \rightarrow R_fCH_2CH_3 + I_2$$

The elemental iodide can combine with the polyfluoroalkyl free radical thereby impeding the desired addition:

$$R_f\cdot + I_2 \rightarrow R_fI + I\cdot$$

The iodine also is thought to promote the elimination of hydrogen iodide from the adduct. The dehydroiodination of the adduct gives rise to low yields and results in the necessity for lengthy purification of the adduct.

Moreover, hydrogen iodide is extremely corrosive which makes it difficult to handle in commercial operations. For instance, it attacks the stainless steel autoclaves commonly used for reactions of this type.

According to the aforenamed Brace patent, the formation of hydrogen iodide during thermal addition of polyfluoroalkyl iodides to olefins is suppressed by conducting the reaction in the presence of carboxylic esters. But even Brace's improvement requires super-atmospheric pressures while the carboxylic esters and their reaction products with hydrogen iodide must be separated from the end product. Then too, the presence of another material in the system may affect, in a deleterious manner, the desired reaction. Thus, the possibility is presented of obtaining even more and varied by-products.

Manifestly, the art stands in need of a cleancut, simple, safe process for the efficient and practical production of polyfluoroalkyl iodides of the type $R_fCH_2CH_2I$ by the thermal addition of polyfluoroalkyl iodides to ethylene.

SUMMARY OF THE INVENTION

It has now been discovered that excellent yields of 1 - iodo - 1,1,2,2-tetrahydropolyfluoroalkanes can be obtained by the thermal reaction between ethylene and a polyfluoroalkyl iodide free of hydrogen on the carbon atom adjacent to the carbon atom bearing the iodine atom, in the gaseous phase at substantially atmospheric pressure, at a temperature sufficient to effect thermal homolysis of the carbon-iodine bond of the polyfluoroalkyl iodide and the provision of such a process constitutes the principal object and purpose of the invention.

DESCRIPTION OF THE INVENTION AND THE PREFERRED EMBODIMENTS

In accordance with the present invention, a gaseous mixture of the polyfluoroalkyl iodide and ethylene are heated to a sufficiently high temperature, whereby thermal homolysis of the carbon-iodine bond occurs, and the heated gaseous mixture maintained until the addition of ethylene and the polyfluoroalkyl radical has taken place. The length of contact time will of course depend on the temperature; the higher the temperature, the shorter residence period that will be required.

Practical results can be realized by heating the reactants at a temperature range of from about 250° C. to about 450° C. for resident periods of from about 3.0 seconds to about 120 seconds. The preferred range is of the order of 325° C. to 400° C. for periods of from about 45 seconds to about 4 seconds, while the optimum range is from about 375° C. to about 400° C. from about 30 seconds to about 5 seconds.

A particularly convenient and economic method of carrying out the invention is to conduct gaseous mixtures of the ethylene and polyfluoroalkyl iodide past a heated reaction zone from whence the mixture is introduced into a purifying station such as a distillation unit, where the addition product is purified. In this type of procedure, the reactants can be heated at any temperature over the temperature range specified thereby forming the requisite polyfluoroalkyl radical which then adds to ethylene. The adduct is promptly swept from the heated reaction zone in order to minimize the formation of by-products. Reactants can be recycled. However at the optimum temperature range (375–400° C.), the conversion of the polyfluoroalkyl iodide approaches 100% obviating the need for recycling it.

Generally speaking, the process of the invention is not critical with respect to the molar ratio of ethylene to the polyfluoroalkyl iodide over the range 0.5 to 6. Smaller ratios however tend to promote coupling of the polyfluoroalkyl radicals with consequent reduction in yields of the desired product. The reaction rate under the conditions set forth herein appears to be dependent upon the rate of thermal homolysis of the perfluoroalkyl iodides to a perfluoroalkyl radical so that the important reaction parameters are temperature and residence time. This is of course an advantage of the process since it is not necessary to carefully control reactant ratios The configuration of the polyfluoroalkyl iodide is not particularly critical except it should not contain a hydrogen atom on that carbon atom next to the carbon atom bearing the iodine atom. Highly fluorinated alkyl iodides of the latter type are unsuitable for the process herein because of the ease with which dehydroiodination occurs. Typical polyfluoroalkyl iodine suitable for practicing the invention include iodofluoroalkanes selected from the group consisting of monoiodoperfluoroalkanes,
monoiodoperfluorochloroalkanes,
α-iodo-ω-hydroperfluorochloroalkanes,
α-iodo-ω-hydroperfluoroalkanes,
α-iodo-ω-chloroperfluoroalkanes,
α-iodo-ω-chloroperfluorochloroalkanes,
α-iodo-ω-bromoperfluoroalkanes, and
α-iodo-ω-bromoperfluorochloroalkanes.

Of course the polyfluoroalkyl iodides must be of sufficiently low molecular weight and high thermal stability whereby they can be vaporized and held in the vaporized state under the reaction conditions called for by the process herein.

The adducts obtained by the process of the invention are characterized by a structural configuration in which a highly fluorinated alkyl grouping is connected to an iodine atom through an ethylene bride. Such fluorinated compounds are well recognized in the fluorochemical field as being exceedingly valuable materials since they can be converted into highly useful stain repellent agents useful in treating textiles of various kinds to render them stain and water repellent. The iodine atom in the polyfluoroalkyl iodides of the invention is a reactive site and can be replaced by numerous functional groupings to engender the stain repellent agents In summing up its advantages, the process of the invention, it should be noted, does not require the high pressure autoclave equipment required to operate in accordance with the known processes. The resulting safety factor alone is a distinct and highly desired benefit. Nor, does it require the presence of extraneous foreign materials to function as inhibitors to diminish formation of undesirable by-products such as hydrogen iodide. Also, there is no need to remove such inhibitors which increase the difficulty of purification.

As a consequence, the process herein is singularly adaptable for the commercial production of fluorinated iodides by the thermal chemical reaction of ethylene with polyfluoroalkyl iodides Reference is now made to the following non-limiting examples:

EXAMPLE 1

1-iodo-1,1,2,2-tetrahydroperfluorononane

A gaseous mixture of ethylene and perfluoroheptyl iodide vapor was introduced at a velocity of 124 cubic centimeters/minute and at essentially atmospheric pressure into a heated reactor consisting of a Pyrex glass tube 60 centimeters long and 1.5 centimeters inside diameter. Heat was provided by nichrome wire having a resistance of 2.4 ohms/feet, wound around the outside wall of the tube. Reaction temperatures were measured by means of an iron/constantin movable thermocouple placed in a centrally located Pyrex glass tube of 4 mm. outside diameter which extended throughout the length of the reactor. The gaseous mixture entered the reaction tube through a preheater which is a spiral formed from a Monel metal tube 60 centimeters long and 5/16 inch in outside diameter and heated by immersion in an oil bath. The perfluoroheptyl iodide vapor was generated by introducing a measured amount of the liquid iodide into a small heated Monel tube evaporator and the resulting vapor mixed with the ethylene.

The gaseous mixture was brought to a temperature of 180° C.–200° C. in the preheater from whence it emerged and was fed into the reactor tube where it was heated to between 379° C. and 401° C. Reaction time amounted to 17 seconds. Approximately 14 g. of ethylene and 87 g. of perfluoroheptyl iodide was processed through the reactor over a period of 2 hours and 10 minutes.

Condensation of the exiting gases produced 91 g. of a reddish wax-like substance which tended to crystallize in fine long needles. Vapor phase chromatographic analysis of the product showed it to be 90% 1-iodo-1,1,2,2-tetrahydroperfluorononane plus a few percent of the 1:2 adduct and unreacted perfluoroheptyl iodide. The material was purified by distillation, the fraction boiling at 89–90° C./20 mm. being collected.

EXAMPLE 2

1-iodo-1,1,2,2,-tetrahydroperfluorodecane

Following the method described in Example 1, a stream of ethylene and perfluorooctyliodide vapor was introduced into the reactor, and heated therein to 380° C to 392° C. The residence time was 13.4 seconds and the ethylene: iodide ratio was 4.3:1.

The conversion was greater than 95% and the yield of 1 - iodo - 1,1,2,2 - tetrahydroperfluorodecane amounted to about 90% based on the perfluorooctyl iodide used.

EXAMPLE 3

1-iodo-1,1,2,2-tetrahydroperfluorodecane

Following the procedure for Example 1, ethylene and perfluorooctyl iodide vapor in a molar ratio of 3.5:1 were passed through the reactor tube wherein the contents were subjected to a temperature of 303° C. for a period of 21 seconds. Vapor phase chromatographic analysis of the product showed a conversion of 63% and the yield of 1-iodo-1,1,2,2-tetrahydroperfluorodecane to be about 87% based on the iodide. This was distilled and the product boiling at 90–91° C./10 mm. collected as pure $C_8F_{17}CH_2CH_2I$. The purified material melted at 50° C. Its structure was established by instrumental and chemical analysis.

EXAMPLE 4

1-iodo-1,1,2,2,tetrahydroperfluorononane

Using the procedure of Example 1, a mixture of perfluoroheptyliodide vapor and ethylene was introduced through the reactor at 347-350° C. and 14.1 seconds. Ethylene to iodide molar ratio was 5.4:1. Conversion was 87% and the yield of 1-iodo-1,1,2,2-tetrahydroperfluorononane was 84% based on the iodide.

EXAMPLE 5

1-iodo-1,1,2,2-tetrahydroperfluorodecane

In this example the molar ratio of perfluorooctyl iodide to ethylene was 2.5:1; the reaction temperature was 247° C. to 255° C. and the residence time was 45 seconds. The conversion amounted to 41% and the yield of 1-iodo-1,1,2,2-tetrahydroperfluorodecane was 82% based on the iodide used.

What is claimed is:

1. In the process of the thermal reaction of a polyfluoroalkyl iodide free of hydrogen on the carbon-atom adjacent to the carbon-atom bearing the iodine atom with ethylene to produce a 1-iodo-1,1,2,2-tetrahydropolyfluoroalkane, the improvement wherein the reaction is carried out in the gaseous phase at substantially atmospheric pressure at a temperature from about 250° C. to about 450° C. and the reaction period from about 3.0 seconds to about 120 seconds.

2. The process according to claim 1 wherein the temperature is from about 325° C. to about 420° C. and the reaction period from about 45 seconds to about 4 seconds.

3. The process according to claim 1 wherein the temperature is from about 375° C. to about 400° C. and the reaction period from about 20 seconds to about 5 seconds.

References Cited

UNITED STATES PATENTS

| | | |
|---|---|---|
| 2,766,299 | 10/1956 | Schaff. |
| 2,975,220 | 3/1961 | Hauptschein et al. |
| 3,016,407 | 1/1962 | Brace _____ 260—653.1 |
| 3,083,238 | 3/1963 | Hauptschein et al. |
| 3,240,825 | 3/1966 | Hauptschein et al. |

DANIEL D. HORWITZ, Primary Examiner

U.S. Cl. XR

117—139.5